US012452477B2

United States Patent
Fernandez Labrador et al.

(10) Patent No.: US 12,452,477 B2
(45) Date of Patent: Oct. 21, 2025

(54) VIDEO AND AUDIO SYNCHRONIZATION WITH DYNAMIC FRAME AND SAMPLE RATES

(71) Applicant: Disney Enterprises, Inc., Burbank, CA (US)

(72) Inventors: Clara Fernandez Labrador, Zurich (CH); Cafer Mertcan Akcay, Zurich (CH); Christopher Richard Schroers, Uster (CH); Joan Massich Vall, Zurich (CH); Scott Labrozzi, Cary, NC (US); Mitchel Jacobs, Malibu, CA (US); Katherine Hinsen, Los Angeles, CA (US); Eitan Abecassis, Raleigh, NC (US)

(73) Assignee: Disney Enterprises, Inc., Burbank, CA (US)

( * ) Notice: Subject to any disclaimer, the term of this patent is extended or adjusted under 35 U.S.C. 154(b) by 61 days.

(21) Appl. No.: 18/674,558

(22) Filed: May 24, 2024

(65) Prior Publication Data

US 2024/0422380 A1     Dec. 19, 2024

Related U.S. Application Data

(60) Provisional application No. 63/521,604, filed on Jun. 16, 2023.

(51) Int. Cl.
*H04N 21/43*     (2011.01)
*H04N 19/60*     (2014.01)

(52) U.S. Cl.
CPC ......... *H04N 21/4307* (2013.01); *H04N 19/60* (2014.11)

(58) Field of Classification Search
CPC .. H04N 21/4307; H04N 19/60; H04N 21/233; H04N 21/43072; H04N 21/8547
See application file for complete search history.

(56) References Cited

U.S. PATENT DOCUMENTS

| | | | |
|---|---|---|---|
| 7,657,829 B2 * | 2/2010 | Panabaker | H04N 21/6332 715/203 |
| 11,601,698 B2 * | 3/2023 | Gramo | H04N 21/4781 |

(Continued)

OTHER PUBLICATIONS

Honglie Chen, Weidi Xie, Triantafyllos Afouras, Arsha Nagrani, Andrea Vedaldi, Andrew Zisserman "Audio-Visual Synchronisation in the Wild" ArXiv abs/2112.04432 2021 24 Pgs.

(Continued)

*Primary Examiner* — Fernando Alcon
(74) *Attorney, Agent, or Firm* — Farjami & Farjami LLP (57) ABSTRACT

A system includes a hardware processor and a memory storing a video/audio (V/A) synchronizer including video and audio encoders. The hardware processor executes the V/A synchronizer to receive raw video and audio extracted from media content, partition the raw video into video frame patches, partition the raw audio into audio samples, pre-process the video frame patches and the audio samples for encoding. The hardware processor further executes the V/A synchronizer to encode, using the video encoder, the pre-processed video frame patches to provide pre-processed and encoded video frame patches used to provide a latent representation of the raw video, encode, using the audio encoder, the pre-processed audio samples to provide pre-processed and encoded audio samples used to provide a latent representation of the raw audio, and synchronize, using the latent representations of the raw video and the raw audio, the raw audio with the raw video.

24 Claims, 5 Drawing Sheets

(56) References Cited

U.S. PATENT DOCUMENTS

| | | | | |
|---|---|---|---|---|
| 2007/0153125 | A1* | 7/2007 | Cooper | G06V 40/20 375/E7.271 |
| 2010/0079605 | A1* | 4/2010 | Wang | H04N 23/00 348/208.4 |
| 2013/0141643 | A1* | 6/2013 | Carson | H04N 21/43072 348/515 |
| 2015/0062353 | A1* | 3/2015 | Dalal | H04N 21/4394 348/515 |
| 2019/0037018 | A1* | 1/2019 | Scurrell | H04L 67/10 |
| 2021/0219012 | A1* | 7/2021 | Maurice | H04N 21/44008 |
| 2024/0129580 | A1* | 4/2024 | Collins | G11B 27/10 |
| 2024/0177740 | A1* | 5/2024 | Danielson | H04L 65/80 |
| 2024/0292044 | A1* | 8/2024 | Zhang | H04N 21/8547 |
| 2025/0054518 | A1* | 2/2025 | Björkman | H04N 21/23418 |

OTHER PUBLICATIONS

Venkatesh S. Kadandale, Juan F. Montesinos, Gloria Haro "VocaLiST: An Audio-Visual Synchronisation Model for Lips and Voices" Interspeech 2022 Sep. 18-22, 2022, Incheon, Korea 5 Pgs.

K R Prajwal, Vinay P. Namboodiri, Rudrabha Mukhopadhyay, C V Jawahar "A lip Sync Expert Is all You Need for Speech to Lip Generation in the Wild" Oral Session A2: Emerging Multimedia Applications MM'20, Oct. 12-16, 2020, Seattle, WA, 9 Pgs.

Yasheng Sun, hang Zhou, Kaisiyuan Wang, Qianyi Wu, Zhibin Hong, Jingtuo Liu, Errui Ding, Jingdong Wang, Ziwei Liu, hideki Koike "Masked Lip-Sync Prediction by Audio-Visual Contextual Wxploitation in transformers" 2022 Association for Computing Machinery 9 Pgs.

Kun Cheng, Xiaodong Cun, Yong Zhang, Menghan Xia, Fei Yin, Mingrui Zhu, Xuan Wang, Jue Wang, Nannan Wang "VideoReTalking: Audio-based Lip Synchronization for Talking Head Video Editing in the Wild" 2022 Association of Computing Machinery 9 Pgs.

Goranka Zoric, Igor S. Pandzic "A Real-Time Lip Sync System using a Genetic Algorithm for Automatic Neural Network Configuration" Proceedings of the 2005 IEEE International Conference on Multimedia and Expo, ICME 2005, Jul. 6-9, 2005, Amsterdam, The Netherlands 4 Pgs.

Barrett E. Koster, Robert D. Rodman and Donald bitzer "Automated Lip-Sync: Direct Translation of Speech-Sound to Mouth-Shape" Proceedings of 1994 Asilomar Conference on Signals, Systems and Computers, Oct. 31, 1994 4 Pgs.

Joon Son Chung and Andrew Zisserman "Out of Time: automated lip sync in the wild" ACCV Workshops Nov. 20, 2016 13 Pgs.

Sucharu Aggarwal, Alka Jindal "Comprehensive Overview of various Lip Synchronization Techniques" 2008 International Symposium on Biometrics and Security Technologies, Islamabad, Pakistan, 2008 6 Pgs.

Namrata Dave "Feature Extraction Methods LPC, PLP, and MFCC in Speech Recognition" International Journal for Advance Research in Engineering and Technology vol. 1, Issue VI, Jul. 2013 5 Pgs.

Etienne Marcheret, Gerasimos Potamianos, Josef Vopicka, Vaibhava Goel "Detecting Audio-Visual Synchrony Using Deep Neural Networks" Interspeech 2015 5 Pgs.

Relja Arandjelovic and Andrew Zisserman "Objects that Sound" ECCV 2018 17 Pgs.

John L. Lewis "Automated Lip-sync: Background and Techniques" Tie Journal of Visualization and Computer Animation vol. 2: (1991) 5 Pgs.

Avijit Vajpayee Zhikang Zhang, Abhinav Jain, Vimal Bhat "A Simple and Efficient method for Dubbed Audio Sync Detection using Comprehensive Sensing" WACV 2023 8 Pgs.

* cited by examiner

VIDEO AND AUDIO SYNCHRONIZATION WITH DYNAMIC FRAME AND SAMPLE RATES

RELATED APPLICATIONS

The present application claims the benefit of and priority to a U.S. Provisional Patent Application Ser. No. 63/521,604 filed on Jun. 16, 2023, and titled "Video and Audio Synchronization with Dynamic Frame and Sample Rates," which is hereby incorporated fully by reference into the present application.

BACKGROUND

Synchronization of the video and audio components of media content (hereinafter "V/A synchronization") is a basic expectation held by anyone that is consuming that media content, whether through streaming, social media, cable television, theaters or any other media distribution channel. From the lens of the camera to the eye of the consumer, there are many instances where V/A synchronization errors can be introduced, such as during content mastering, third party modifications, content encoding, or client playback, to name a few examples. Studies show that the viewer experience can be negatively affected by as little as a 45 millisecond discrepancy in V/A synchronization, which is equivalent to a delay of a single frame in a 90 minute film at 25 frames per second (fps).

Although commercial solutions for performing V/A synchronization exist, their scale and capabilities are insufficient for production. As a result, detecting V/A synchronization problems and identifying their origin remain significant burdens for media production quality control teams, as these have remained largely manual processes. Thus, there is a need in the art for an automated V/A synchronization solution that can accurately identify and resolve V/A synchronization errors before they reach the viewer.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for performing video/audio (V/A) synchronization with dynamic frame and sample rates. V/A synchronization is the task of aligning audio and video signals such that they correspond to the same point in time. In the context of film production and live broadcasting, there are a number of complex processes to create and fuse different media information until the final product including the video and audio streams is ready. Unfortunately, any of these processes can cause unwanted delays and create asynchronous streams. As noted above, although commercial solutions for performing V/A synchronization exist, their scale and capabilities are insufficient for production. As a result, detecting V/A synchronization problems and identifying their origin remain significant burdens for media production quality control teams, as these have remained largely manual processes.

It is noted that there have been several attempts in academia to solve the problem of V/A synchronization. However, while some academic models can successfully predict the alignment between audio and video signals, these solutions require an intermediate encoding of the input which can undesirably alter the original content and render the model predictions unreliable. Moreover, all existing methods transform the input videos to have the same predetermined frame rate, e.g., twenty-five frames per second (25 fps), which can introduce synchronization artifacts. In practice, there are a large variety of standard frame rates used in video production. Therefore, it is important to develop a model robust to different video frame rates and make predictions on the original content.

By way of overview, the present application introduces a new convolution-free V/A synchronizer model for V/A synchronization. The V/A synchronizer disclosed herein encodes raw video and raw audio into latent representations using only modality-specific Transformers. In contrast to existing methods, convolutional neural networks (CNNs) are not used as feature extractors. In other words, the V/A/synchronizer disclosed herein does not include a CNN. As a result, the bias associated with the use of CNNs is not introduced to the present V/A synchronizer model, resulting in a significantly smaller and faster model. The V/A synchronizer model architecture disclosed herein also has the advantage of being able to process inputs of varying sizes. In some implementations, the present V/A synchronization solution uses a fixed time input of 0.2 seconds, but inputs a variable number of video frames depending on the original frame rate of the input video, without performing frame rate conversion. In addition, the present V/A synchronization solution introduces a new time-aware positional encoding in the video branch, thereby making the V/A synchronizer model robust to different frame rates. It is noted that the V/A synchronizer model disclosed herein is trained using a contrastive learning approach, where the distance between audio and video windows which are in synchronization is minimized and the distance between out of synchronization pairs is maximized.

It is further noted that, in some implementations, the systems and methods disclosed by the present application may be substantially or fully automated. As used in the present application, the terms "automation," "automated" and "automating" refer to systems and processes that do not require the participation of a human operator or system administrator. Although in some implementations, a human operator or system administrator may sample or otherwise review the performance of the systems and methods disclosed herein, that human involvement is optional. Thus, the methods described in the present application may be performed under the control of hardware processing components of the disclosed automated systems.

The V/A synchronization solution disclosed in the present application can advantageously be applied to a wide variety of different types of media content that includes audio-video content. Examples of such media content may include television (TV) episodes, movies, or video games, to name a few. In addition, or alternatively, in some implementations, such media content may be or include digital representations of persons, fictional characters, locations, objects, and identifiers such as brands and logos, for example, which populate a virtual reality (VR), augmented reality (AR), or mixed reality (MR) environment. That media content may depict virtual worlds that can be experienced by any number of users synchronously and persistently, while providing continuity of data such as personal identity, user history, entitlements, possessions, payments, and the like. Moreover, in some implementations, such media content may be or include digital content that is a hybrid of traditional audio-video and fully immersive VR/AR/MR experiences, such as interactive video.

Figure 1:
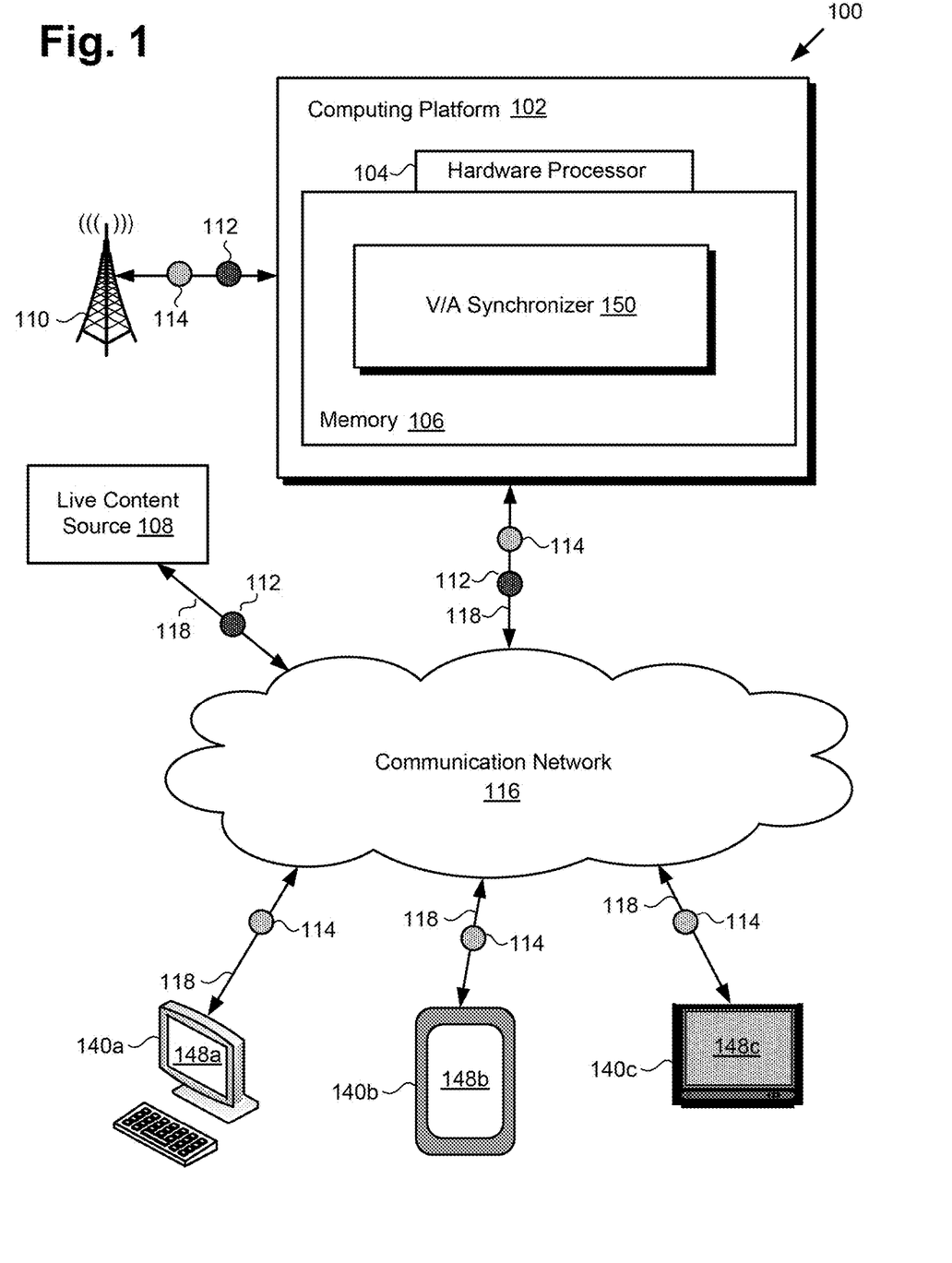
FIG. 1 shows a diagram of an exemplary system for performing video/audio (V/A) synchronization with dynamic frame and sample rates, according to one implementation.

FIG. 1 shows a diagram of exemplary system 100 for performing V/A synchronization with dynamic frame and sample rates, according to one implementation. System 100 includes computing platform 102 having hardware processor 104 and memory 106 implemented as a computer-readable non-transitory storage medium. According to the present exemplary implementation, memory 106 stores V/A synchronizer model 150 (hereinafter "V/A synchronizer 150") in the form of a machine learning (ML) model-based V/A synchronizer.

It is noted that, as defined in the present application, the expression "ML model" refers to a computational model for making predictions based on patterns learned from samples of data or training data. Various learning algorithms can be used to map correlations between input data and output data. These correlations form the computational model that can be used to make future predictions on new interaction data. Such a predictive model may include one or more logistic regression models, Bayesian models, artificial neural networks (NNs) such as Transformers, large-language models, or multimodal foundation models, to name a few examples. In various implementations, ML models may be trained as classifiers and may be utilized to perform image processing, audio processing, natural-language processing, and other inferential analyses.

As shown in FIG. 1, system 100 is implemented within a use environment including one or both of live content source 108 and content transmission source 110 each providing media content 112 including audio-video content to system 100. Content transmission source 110 may also receive V/A synchronized media content 114 and may broadcast V/A synchronized media content 114 to end-user consumers of V/A synchronized media content 114. Moreover, and as depicted in FIG. 1, in some use cases, one or both of live content source 108 and content transmission source 110 may find it advantageous or desirable to make V/A synchronized media content 114 available via an alternative distribution channel, such as communication network 116, which may take the form of a packet-switched network, such as the Internet. For instance, system 100 may be utilized by one or both of live content source 108 and content transmission source 110 to distribute V/A synchronized media content 114 as part of a content stream, which may be an Internet Protocol (IP) content stream provided by a streaming service or a video-on-demand (VOD) service.

The use environment of system 100 also includes user systems 140a, 140b, and 140c (hereinafter "user systems 140a-140c") receiving V/A synchronized media content 114 from system 100 via communication network 116. Thus, in various implementations, V/A synchronized media content 114 may be transmitted to end-user consumers of V/A synchronized media content 114 by content transmission source 110, may be delivered to user systems 140a-140c by system 100 via communication network 116, or may both be transmitted to end-user consumers of V/A synchronized media content 114 by content transmission source 110 and delivered to user systems 140a-140c by system 100 via communication network 116. Also shown in FIG. 1 are network communication links 118 of communication network 116 interactively connecting system 100 with live content source 108 and user systems 140a-140c, as well as displays 148a, 148b, and 148c (hereinafter "displays 148a-148c") of respective user systems 140a-140c.

With respect to the representation of system 100 shown in FIG. 1, it is noted that although the present application refers to V/A synchronizer 150 as being stored in memory 106 for conceptual clarity, more generally, memory 106 may take the form of any computer-readable non-transitory storage medium. The expression "computer-readable non-transitory storage medium," as used in the present application, refers to any medium, excluding a carrier wave or other transitory signal that provides instructions to hardware processor 104 of computing platform 102 or to respective hardware processors of user systems 140a-140c. Thus, a computer-readable non-transitory storage medium may correspond to various types of media, such as volatile media and non-volatile media. Volatile media may include dynamic memory, such as dynamic random access memory (dynamic RAM), while non-volatile memory may include optical, magnetic, or electrostatic storage devices. Common forms of computer-readable non-transitory storage media include: optical discs such as DVDs, RAM, programmable read-only memory (PROM), erasable PROM (EPROM), and FLASH memory.

Moreover, in some implementations, system 100 may utilize a decentralized secure digital ledger in addition to, or in place of, memory 106. Examples of such decentralized secure digital ledgers may include a blockchain, hashgraph, directed acyclic graph (DAG), and Holochain® ledger. In use cases in which the decentralized secure digital ledger is a blockchain ledger, it may be advantageous or desirable for the decentralized secure digital ledger to utilize a consensus mechanism having a proof-of-stake (POS) protocol, rather than the more energy intensive proof-of-work (PoW) protocol.

Although FIG. 1 depicts V/A synchronizer 150 as being stored in its entirety in memory 106, that representation is also provided merely as an aid to conceptual clarity. More generally, system 100 may include one or more computing platforms 102, such as computer servers, which may be co-located, or may form an interactively linked but distributed system, such as a cloud-based system. As a result, hardware processor 104 and memory 106 may correspond to distributed processor and memory resources within system 100. Consequently, in some implementations, various components of V/A synchronizer 150 may be stored remotely from one another on the distributed memory resources of system 100.

Hardware processor 104 may include multiple a plurality of processing units, such as one or more central processing units, one or more graphics processing units and one or more tensor processing units, one or more field-programmable gate arrays (FPGAs), custom hardware for machine-learning training or inferencing, and an application programming interface (API) server. By way of definition, as used in the present application, the terms "central processing unit" (CPU), "graphics processing unit" (GPU), and "tensor processing unit" (TPU) have their customary meaning. That is to say, a CPU includes an Arithmetic Logic Unit (ALU) for carrying out the arithmetic and logical operations of computing platform 102, as well as a Control Unit (CU) for retrieving programs from memory 106, while a GPU may be implemented to reduce the processing overhead of the CPU by performing computationally intensive graphics or other processing tasks. A TPU is an application-specific integrated circuit (ASIC) configured specifically for artificial intelligence (AI) processes such as machine learning.

In some implementations, computing platform 102 may correspond to one or more web servers accessible over a packet-switched network such as the Internet. Alternatively, computing platform 102 may correspond to one or more computer servers supporting a wide area network (WAN), a local area network (LAN), or included in another type of private or limited distribution network. In addition, or alternatively, in some implementations system 100 may utilize a local area broadcast method, such as User Datagram Protocol (UDP) or Bluetooth®. For example, in some implementations, system 100 may be implemented in software, or as virtual machines. Moreover, in some implementations, system 100 may be configured to communicate via a high-speed network suitable for high performance computing (HPC). Thus, in some implementations, communication network 116 may be or include a 10 GigE network or an Infiniband network, for example.

It is further noted that, although user systems 140a-140c are shown variously as desktop computer 140a, smartphone 140b, and smart television (smart TV) 140c, in FIG. 1, those representations are provided merely by way of example. In other implementations, user systems 140a-140c may take the form of any suitable mobile or stationary computing devices or systems that implement data processing capabilities sufficient to provide a user interface, support connections to communication network 116, and implement the functionality ascribed to user systems 140a-140c herein. In other implementations, one or more of user systems 140a-140c may take the form of a laptop computer, tablet computer, digital media player, game console, or a wearable communication device such as a smartwatch, AR device, or VR device (e.g., headset).

It is also noted that displays 148a-148c may take the form of liquid crystal displays (LCDs), light-emitting diode (LED) displays, organic light-emitting diode (OLED) displays, quantum dot (QD) displays, or any other suitable display screens that perform a physical transformation of signals to light. Furthermore, displays 148a-148c may be physically integrated with respective user systems 140a-140c or may be communicatively coupled to but physically separate from respective user systems 140a-140c. For example, where any of user systems 140a-140c is implemented as a smartphone, laptop computer, or tablet computer, its respective display will typically be integrated with that user system. By contrast, where any of user systems 140a-140c is implemented as a desktop computer, its respect display may take the form of a monitor separate from that user system in the form of a computer tower.

In one implementation, content transmission source 110 may be a media entity providing media content 112. Media content 112 may include content from a linear TV program stream, including high-definition (HD) or ultra-HD (UHD) baseband video signal with embedded audio, captions, time code, and other ancillary metadata, such as ratings and/or parental guidelines. In some implementations, media content 112 may also include multiple audio tracks, and may utilize secondary audio programming (SAP) and/or Descriptive Video Service (DVS). Alternatively, in some implementations, media content 112 may be video game content. As noted above, in some implementations media content 112 may be or include digital representations of persons, fictional characters, locations, objects, and identifiers such as brands and logos, which populate a VR, AR, or MR environment. As also noted above, in some implementations media content 112 may depict virtual worlds that can be experienced by any number of users synchronously and persistently, while providing continuity of data such as personal identity, user history, entitlements, possessions, payments, and the like. As also noted above, media content 112 may be or include content that is a hybrid of traditional audio-video and fully immersive VR/AR/MR experiences, such as interactive video.

In some implementations, media content 112 may be the same source video that is broadcast to a traditional TV audience. Thus, content transmission source 110 may take the form of a conventional cable and/or satellite TV network. As noted above, content transmission source 110 may find it advantageous or desirable to make V/A synchronized media content 114 available via an alternative distribution channel, such as by being streamed via communication network 116 in the form of a packet-switched network, such as the Internet. Alternatively, or in addition, although not depicted in FIG. 1, in some use cases V/A synchronized media content 114 may be distributed on a physical medium, such as a DVD, Blu-ray Disc®, or FLASH drive.

Figure 2:
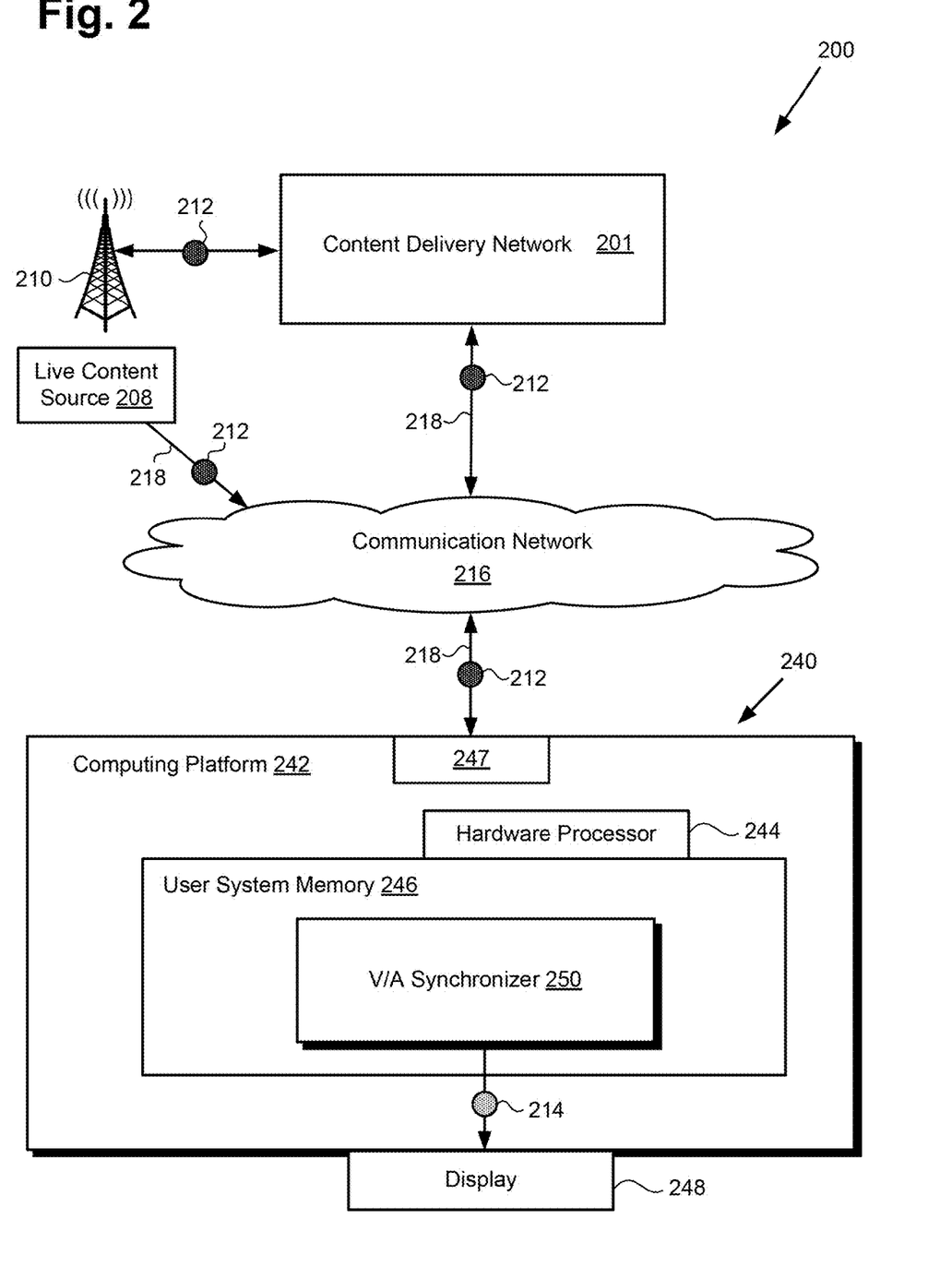
FIG. 2 shows a diagram depicting another exemplary system for performing V/A synchronization with dynamic frame and sample rates, according to one implementation.

FIG. 2 shows an exemplary system, i.e., user system 240, for performing V/A synchronization with dynamic frame and sample rates, according to another implementation. As shown in FIG. 2, user system 240 includes computing platform 242 having transceiver 247, hardware processor 244, display 248, and user system memory 246 implemented as a computer-readable non-transitory storage medium storing V/A synchronizer model 250 (hereinafter "V/A synchronizer 250").

As further shown in FIG. 2, user system 240 is utilized in use environment 200 including live content source 208 and content transmission source 210 providing media content 212 to content delivery network (CDN) 201. One or both of live content source 208 and CDN 201, in turn, distributes media content 212 to user system 240 via communication network 216 and network communication links 218. According to the implementation shown in FIG. 2, V/A synchronizer 250 stored in user system memory 246 of user system 240 is configured to receive media content 212 and to output V/A synchronized media content 214 for rendering on display 248 of user system 240.

Live content source 208, content transmission source 210, media content 212, V/A synchronized media content 214, communication network 216 and network communication links 218 correspond respectively in general to live content source 108, content transmission source 110, media content 112, V/A synchronized media content 114, communication network 116 and network communication links 118, in FIG. 1. In other words, live content source 208, content transmission source 210, media content 212, V/A synchronized media content 214, communication network 216 and network communication links 218 may share any of the characteristics attributed to respective live content source 108, content transmission source 110, media content 112, V/A synchronized media content 114, communication network 116 and network communication links 118 by the present disclosure, and vice versa.

User system 240 and display 248 correspond respectively in general to any or all of user systems 140a-140c and respective displays 148a-148c in FIG. 1. Thus, user systems 140a-140c and displays 148a-148c may share any of the characteristics attributed to user system 240 and display 248 by the present disclosure, and vice versa. For example, like displays 148a-148c, display 248 may take the form of an LCD, LED display, OLED display, or QD display. Moreover, although not shown in FIG. 1, each of user systems 140a-140c may include features corresponding respectively to computing platform 242, transceiver 247, hardware processor 244, and user system memory 246 storing V/A synchronizer 250.

Transceiver 247 may be implemented as a wireless communication unit configured for use with one or more of a variety of wireless communication protocols. For example, transceiver 247 may include a fourth generation (4G) wireless transceiver and/or a 5G wireless transceiver. In addition, or alternatively, transceiver 247 may be configured for communications using one or more of Wireless Fidelity (Wi-Fi®), Worldwide Interoperability for Microwave Access (WiMAX®), Bluetooth®, Bluetooth® low energy (BLE), ZigBee®, radio-frequency identification (RFID), near-field communication (NFC), and 60 GHz wireless communications methods.

User system hardware processor 244 may include a plurality of hardware processing units, such as one or more CPUs, one or more GPUs, one or more TPUs, and one or more FPGAs, as those features are defined above.

V/A synchronizer 250, in FIG. 2, corresponds in general to V/A synchronizer 150, in FIG. 1, and includes all of the features and can perform all of the operations attributed to V/A synchronizer 150 by the present disclosure. In other words, in implementations in which client hardware processor 244 executes V/A synchronizer 250 stored locally in user system memory 246, user system 240 may perform any of the actions attributed to system 100 by the present disclosure. Thus, in some implementations, V/A synchronizer 250 executed by hardware processor 244 of user system 240 may receive media content 212 and may output V/A synchronized media content 214 for rendering on display 248 of user system 240.

Figure 3:
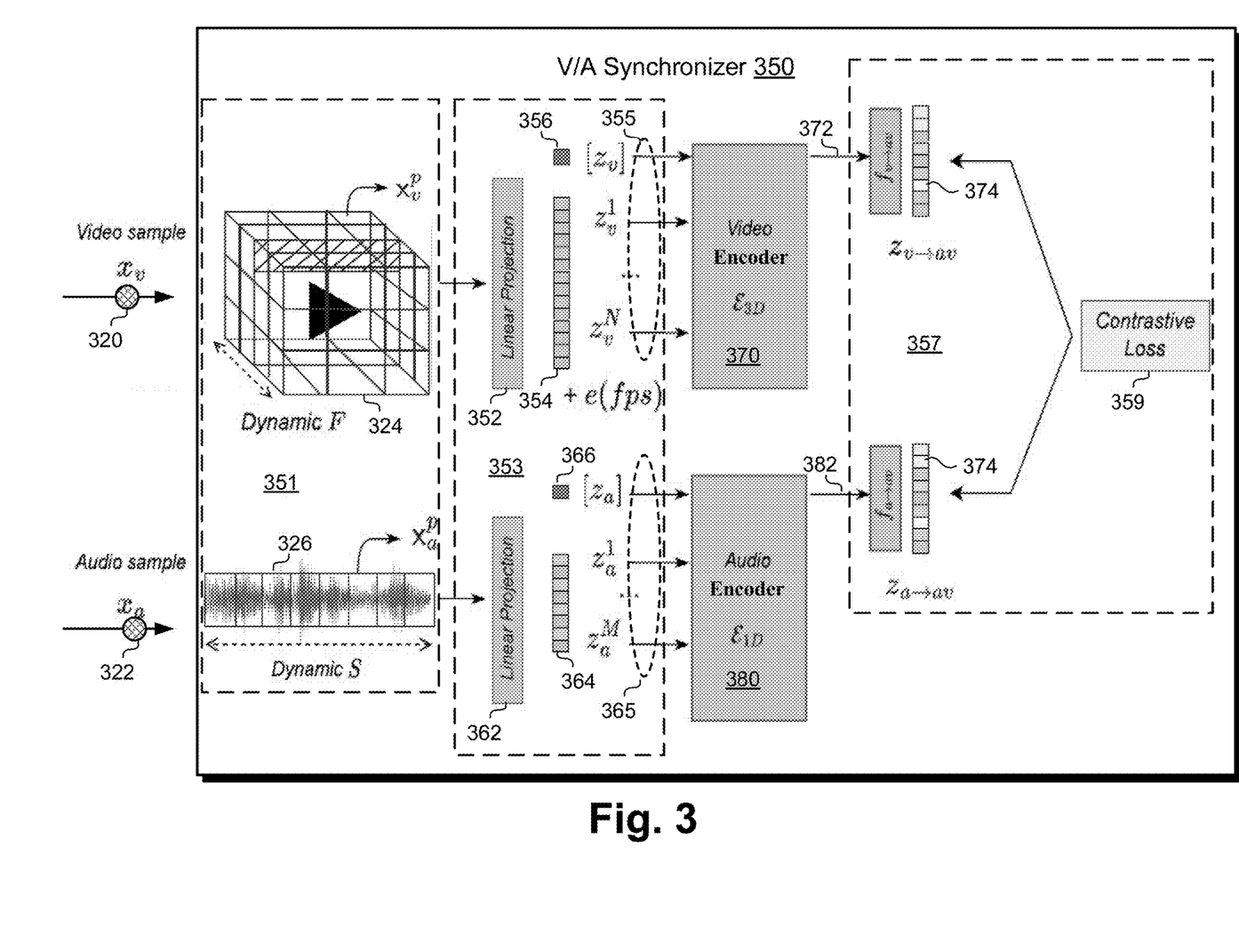
FIG. 3 shows a diagram of a V/A synchronizer suitable for use by the systems shown in FIGS. 1 and 2, according to one implementation.

FIG. 3 shows a diagram of a V/A synchronizer model 350 (hereinafter "V/A synchronizer 350") suitable for use by the system 100 in FIG. 1 and user system 240 in FIG. 2, according to one implementation. As shown in FIG. 3, V/A synchronizer 350 may include partitioning stage 351 receiving raw video 320 and raw audio 322 as inputs, pre-processing stage 353, video encoder 370, audio encoder 380, and synchronization stage 357 configured to synchronize raw audio 322 with raw video 320.

As further shown in FIG. 3, partitioning stage 351 produces a plurality of video frame patches $x_v^p$ identified by representative reference number 324, as well as a plurality of audio samples $x_a^p$ identified by representative reference number 326. Pre-processing stage 353 includes linear projection blocks 352 and 362, which may take the form of respective trained affine layers for example, plurality of tokenized video frame patches 354, $z_v^1 \ldots z_v^N$, output by linear projection block 352, plurality of tokenized audio samples 364, $z_a^1 \ldots z_a^M$, output by linear projection block 362, learnable video modality token 356, $[z_v]$, and learnable audio modality token 366, $[z_a]$. Pre-processing stage 353 provides one or more pre-processed video frame patches 355 and plurality of pre-processed audio samples 365 as inputs to respective video encoder 370 and audio encoder 380. Sinusoidal positional encoding with timestamp information is added to inform the attention layer about the relative position of video frames and pre-processed video frame patches 355. Synchronization stage 357 receives latent representation 372 of raw video 320 output by video encoder 370, and also receives latent representation 382 of raw audio 322 output by audio encoder 380. Also shown in FIG. 3 are common space 374 where latent space representations 372 and 382 can be compared, and contrastive loss 359. It is noted that, according to the exemplary implementation shown in FIG. 3, synchronization of raw audio 322 with raw video 320 is performed by comparison of latent representation 372 of raw video 320 with latent representation 382 of raw audio 322 through contrastive loss 359.

V/A synchronizer 350 corresponds in general to V/A synchronizers 150 and 250 in respective FIGS. 1 and 2. Consequently, V/A synchronizers 150 and 250 may each share any of the characteristics attributed to V/A synchronizer 350 by the present application, and vice versa. That is to say, each of V/A synchronizer 150 and V/A synchronizer 250 may include features corresponding respectively to partitioning stage 351, pre-processing stage 353, video encoder 370, audio encoder 380, and synchronization stage 357.

Figure 4A:
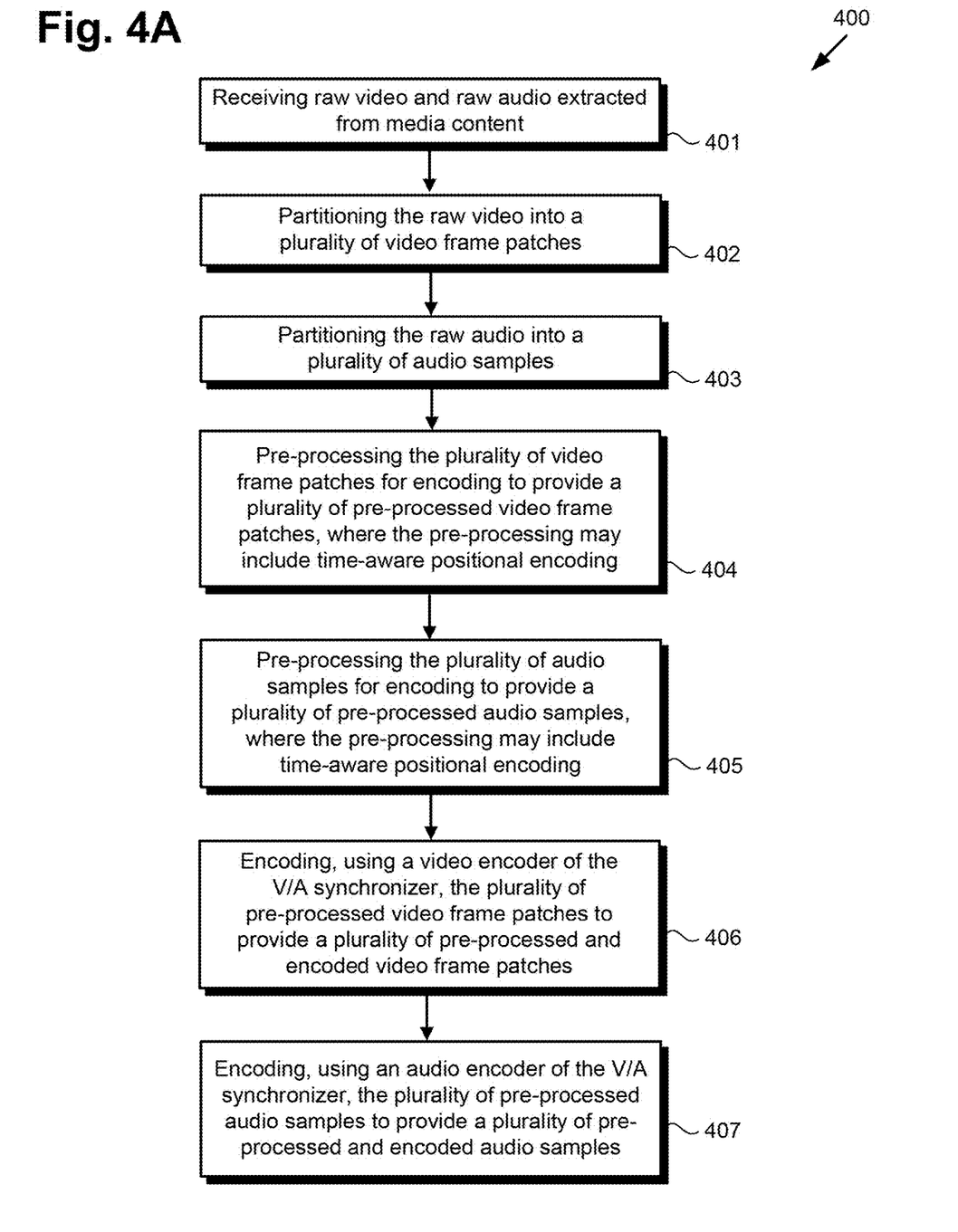
FIG. 4A shows a flowchart presenting actions included in a method for performing V/A synchronization with dynamic frame and sample rates, according to one implementation.
Figure 4B:
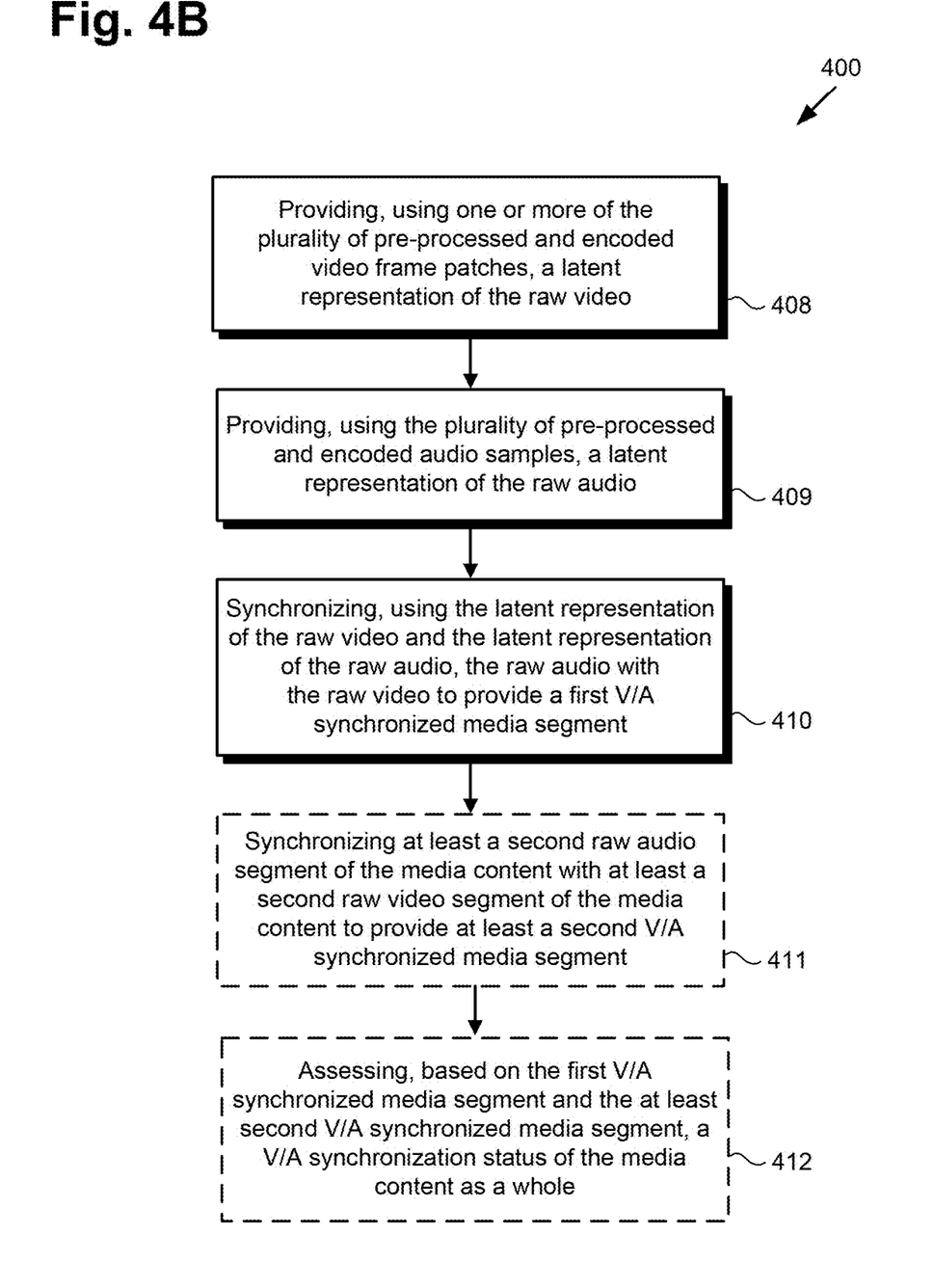
FIG. 4B shows additional actions for continuing the method presented in FIG. 4A.

The functionality of system 100, user system 140a-140c/240, and V/A synchronizer 150/250/350 shown variously in FIGS. 1, 2 and 3 will be further described by reference to FIGS. 4A and 4B. FIG. 4A shows flowchart 400 presenting an exemplary method for performing V/A synchronization with dynamic frame and sample rates, according to one implementation, while FIG. 4B shows additional actions for continuing the method presented in FIG. 4A. With respect to the method outlined in FIGS. 4A and 4B, it is noted that certain details and features have been left out of flowchart 400 in order not to obscure the discussion of the inventive features in the present application.

Referring to FIG. 4A in combination with FIGS. 1, 2 and 3, flowchart 400 includes receiving raw video 320 and raw audio 322 extracted from media content 112/212 (action 401). Media content 112/212 may include content in the form of video games, music videos, animation, movies, or episodic TV content that includes episodes of TV shows that are broadcasted, streamed, or otherwise available for download or purchase on the Internet or via a user application. In addition, or alternatively, as noted above in some implementations media content 112/212 may be or include digital representations of persons, fictional characters, locations, objects, and identifiers such as brands and logos, which populate a VR, AR, or MR environment. Moreover, and as further noted above, in some implementations, media content 112/212 may depict virtual worlds that can be experienced by any number of users synchronously and persistently, while providing continuity of data such as personal identity, user history, entitlements, possessions, payments, and the like. As also noted above, media content 112/212 may be or include content that is a hybrid of traditional audio-video and fully immersive VR/AR/MR experiences, such as interactive video.

V/A synchronizer 150/250/350 is configured to ingest short clips raw video 320 and raw audio 322 having a fixed time duration, such as 0.2 seconds for example, or any other desirable time duration. However, in contrast to conventional synchronization methods utilizing CNNs, the number of video frames included in raw video 320 and the number of audio samples included in raw audio 322 dynamically varies depending on the original frame rate of raw video 320 and the original sample rate of raw audio 322. Convolutional CNN-based synchronization models are restricted to fixed-size inputs. As a result, a common practice in conventional methods is to use a fixed input of 5 video frames and 3200 audio samples, which is equivalent to 0.2 seconds at 25 fps and 16 kHz, respectively. V/A synchronizer 150/250/350 however, is purely based on Transformers and does not include a CNN, and is thus able to handle inputs of varying sizes. Based on that capability of Transformers, the time input duration may be fixed to t=0.2 seconds following previous methods, but the number of video frames and audio samples input to V/A synchronizer 150/250/350 is not fixed, but rather varies based on the original video frame and audio sample rates of media content 112.

For example, the number of frames, F, dynamically changes according to the video frame rate given a fixed input time, t, as F=t*fps. It is noted that either full video frames or face crops can be used to provide raw video 320. Analogously to the case for the number of input frames F, the number of audio samples, S, included in raw audio 322 having fixed input time, t, dynamically changes according to S=t*sample rate (sr). That is to say, how many video frames are included in raw video 320 varies based on the original frame rate of media content 112, and how many audio samples are included in raw audio 322 varies based on an original sample rate of media content 112. Moreover, it is noted that raw video 320 and raw audio 322 are not transformed from any other original media specifications of media content 112, such as the codec of media content 112, for example.

Referring to FIGS. 1, 3 and 4A in combination, in some implementations, raw video 320 and raw audio 322 extracted from media content 112 may be received, in action 401, by V/A synchronizer 150/350 of system 100, executed by hardware processor 104 of computing platform 102. In other implementations, referring to FIGS. 2, 3 and 4A in combination, raw video 320 and raw audio 322 extracted from media content 212 may be received, in action 401, by V/A synchronizer 250/350 of user system 240, executed by hardware processor 244 of user system computing platform 242.

Referring to FIGS. 3 and 4A in combination, flowchart 400 further includes partitioning raw video 320 into plurality of video frame patches 324 (action 402). Raw video 320 is partitioned into video frame patches $x_v^p \in \mathbb{R}^{f \times h \times w \times c}$, $p \in \{1, 2, \ldots, N\}$, with N=HWF/hwf. Referring to FIGS. 1, 3 and 4A in combination, in some implementations, raw video 320 may be partitioned into plurality of video frame patches 324, in action 402, by partitioning stage 351 of V/A synchronizer 150/350 of system 100, executed by hardware processor 104 of computing platform 102. In other implementations, referring to FIGS. 2, 3 and 4A in combination, raw video 320 may be partitioned into plurality of video frame patches 324, in action 402, by partitioning stage 351 of V/A synchronizer 250/350 of user system 240, executed by hardware processor 244 of user system computing platform 242.

Continuing to refer to FIGS. 3 and 4A in combination, flowchart 400 further includes partitioning raw audio 322 into plurality of audio samples 326 (action 403). Raw audio 322 is partitioned into audio samples $x_a^p \in \mathbb{R}^{1 \times s}$, $p \in \{1, 2, \ldots, M\}$, with M=S/s. Referring to FIGS. 1, 3 and 4A in combination, in some implementations, raw audio 322 may be partitioned into plurality of audio samples 326, in action 403, by partitioning stage 351 of V/A synchronizer 150/350 of system 100, executed by hardware processor 104 of computing platform 102. In other implementations, referring to FIGS. 2, 3 and 4A in combination, raw audio 322 may be partitioned into plurality of audio samples 326, in action 403, by partitioning stage 351 of V/A synchronizer 250/350 of user system 240, executed by hardware processor 244 of user system computing platform 242. It is noted that although flowchart 400 depicts action 403 as following action 402, that representation is merely provided in the interests of conceptual clarity. In various implementations, action 403 may follow action 402, may precede action 402, or may be performed in parallel with, i.e., contemporaneously with, action 402.

Continuing to refer to FIGS. 3 and 4A in combination, flowchart 400 further includes pre-processing plurality of video frame patches 324 for encoding to provide plurality of pre-processed video frame patches 355, where the pre-processing may include time-aware positional encoding, as described below (action 404).

Pre-processing of plurality of video frame patches 324 may include projecting, using linear projection block 352 each of plurality of video frame patches 324 onto a respective token to provide plurality of tokenized video frame patches 354. Plurality of video frame patches 324 undergoing pre-processing in action 404 are flattened and projected using linear projection block 352, which may be or include a trainable affine layer for example, into plurality of tokenized video frame patches 354 in the form of one-dimensional (1-D) vectors $z_v^1 \ldots z_v^N$. Pre-processing of plurality of video frame patches 324 may further include concatenating plurality of tokenized video frame patches 354 with learnable video modality token 356, by prepending learnable video modality token 356 to plurality of tokenized video frame patches 354 for example.

Pre-processing of one plurality of video frame patches 324 may further include applying time-aware positional encoding to plurality of tokenized video frame patches 354. Such time-aware positional encoding encodes not only the natural order of the frames of raw video 320, but also the relative time distance between the frames, thereby providing exact timestamp information. In time-aware positional encoding, plurality of tokenized video frame patches 354 undergo three-dimensional (3-D) sinusoidal positional encoding:

$$e_{(x,2i)} = \sin\frac{x}{\tau^{\frac{6i}{D}}}, e_{(x,2i+1)} = \cos\frac{x}{\tau^{\frac{6i}{D}}}$$

$$e_{(y,2j+\frac{D}{3})} = \sin\frac{y}{\tau^{\frac{6j}{D}}}, e_{(y,2j+1+\frac{D}{3})} = \cos\frac{y}{\tau^{\frac{6j}{D}}}$$

$$e_{(z,2k+\frac{2D}{3})} = \sin\frac{z}{\tau^{\frac{6k}{D}}}, e_{(z,2k+1+\frac{2D}{3})} = \cos\frac{z}{\tau^{\frac{6k}{D}}}$$

where (x, y, z) is the position of a video frame patch in image plane and time with $$x \in \left\{0, 1, \ldots, \frac{H}{h} - 1\right\}, y \in \left\{0, 1, \ldots, \frac{W}{w} - 1\right\},$$

$$\text{and } z \in \left\{0, 1, \ldots, \frac{F}{f} - 1\right\}, \tau = 1000,$$

and i, j, k ∈

$$\left\{0, 1, \ldots, \frac{D}{6} - 1\right\}$$

so that each third of the positional encoding encodes the position in the respective dimension. For time-aware positional encoding of video, a temporal factor that depends on the frame rate of raw video 320 is applied such that the value of z identified above is modified to:

$$z = \left\{0, 1, \ldots, \frac{F}{f} - 1\right\} \frac{100 f}{fps},$$

where 100 is used as a scaling factor.

Referring to FIGS. 1, 3 and 4A in combination, in some implementations, pre-processing of plurality of video frame patches 324 for encoding to provide plurality of pre-processed video frame patches 355, in action 404, may be performed by pre-processing stage 353 of V/A synchronizer 150/350 of system 100, executed by hardware processor 104 of computing platform 102. In other implementations, referring to FIGS. 2, 3 and 4A in combination, pre-processing of plurality of video frame patches 324 for encoding to provide plurality of pre-processed video frame patches 355, in action 404, may be performed by pre-processing stage 353 of V/A synchronizer 250/350 of user system 240, executed by hardware processor 244 of user system computing platform 242.

It is noted that although flowchart 400 depicts action 404 as following action 403, that representation is merely provided in the interests of conceptual clarity. Action 404 does follow action 402. However, in various implementations, action 404 may follow action 403, may precede action 403, or may be performed in parallel with, i.e., contemporaneously with, action 403.

Continuing to refer to FIGS. 3 and 4A in combination, flowchart 400 further includes pre-processing plurality of audio samples 326 for encoding to provide plurality of pre-processed audio samples 365, where the pre-processing may include time-aware positional encoding, as further described below (action 405). Pre-processing of plurality of audio samples 326 may include projecting, using linear projection block 362, each of plurality of audio samples 326 onto a respective token to provide plurality of tokenized audio samples 364. Plurality of audio samples 326 are projected to a higher dimension using linear projection block 362, which may be or include a trainable affine layer for example, into plurality of tokenized video frame patches 364 in the form of tokens $z_a^1 \ldots z_a^M$. Pre-processing of plurality of audio samples 326 may further include concatenating plurality of tokenized audio samples 364 with learnable audio modality token 366, by prepending learnable video modality token 366 to plurality of tokenized audio samples 364 for example.

Pre-processing of plurality of audio samples 326 may further include applying time-aware positional encoding to plurality of tokenized audio samples 364. Such time-aware positional encoding encodes not only the natural order of the audio samples in raw audio 322, but also the relative time distance between the audio samples, thereby providing exact timestamp information. In time-aware positional encoding, plurality of tokenized audio samples 364 undergo 1-D positional encoding, and a temporal factor that depends on the sample rate of raw audio 322 is applied such that:

$$p = \left\{0, 1, \ldots, \frac{S}{s} - 1\right\} \frac{100 s}{sr},$$

where 100 is used as a scaling factor. It is noted that, unlike conventional methods that transform the raw audio signal into Mel-spectrograms or Mel-frequency cepstral coefficients (MFCC) features, V/A synchronizer 150/250/350 operates directly on raw audio 322, thereby advantageously saving computation time and retaining all audio signal information.

Referring to FIGS. 1, 3 and 4A in combination, in some implementations, pre-processing of plurality of audio samples 326 for encoding to provide pre-processed audio samples 365, in action 405, may be performed by pre-processing stage 353 of V/A synchronizer 150/350 of system 100, executed by hardware processor 104 of computing platform 102. In other implementations, referring to FIGS. 2, 3 and 4A in combination, pre-processing of plurality of audio samples 326 for encoding to provide one or more pre-processed audio samples 365, in action 405, may be performed by pre-processing stage 353 of V/A synchronizer 250/350 of user system 240, executed by hardware processor 244 of user system computing platform 242.

Although flowchart 400 depicts action 405 as following action 404, that representation is merely provided in the interests of conceptual clarity. Action 405 does follow action 403. However, in various implementations, actions 403 and 405 may follow action 404, may precede action 404, may precede action 402, or may be performed in parallel with, i.e., contemporaneously with, one or both of action 402 and 404.

Continuing to refer to FIGS. 3 and 4A in combination, flowchart 400 further includes encoding, using video encoder 370, plurality of pre-processed video frame patches 355 to provide a plurality of pre-processed and encoded video frame samples (action 406). According to the exemplary implementation shown in FIG. 3, video encoder 370 is a Transformer trained to encode video. For example, video encoder 370 may be implemented as a 3-D Vision Transformer $E_{3-D}$.

Referring to FIGS. 1, 3 and 4A in combination, in some implementations, encoding of one or more pre-processed video frame patches 355 to provide the plurality of pre-processed and encoded video frame samples, in action 406, may be performed by V/A synchronizer 150/350 of system 100, executed by hardware processor 104 of computing platform 102, and using video encoder 370. In other implementations, referring to FIGS. 2, 3 and 4A in combination, encoding of one or more pre-processed video frame patches 355 to provide the plurality of pre-processed and encoded video frame samples, in action 406, may be performed by V/A synchronizer 250/350 of user system 240, executed by hardware processor 244 of user system computing platform 242, and using video encoder 370.

Although flowchart 400 depicts action 406 as following action 405, that representation is merely provided in the interests of conceptual clarity. Action 406 does follow action 404. However, in various implementations, actions 402, 404 and 406 may follow action 405, may precede action 405, may precede action 403, or may be performed in parallel with, i.e., contemporaneously with, one or both of action 403 and 405.

Continuing to refer to FIGS. 3 and 4A in combination, flowchart 400 further includes encoding, using audio encoder 380, plurality of pre-processed audio samples 365 to provide a plurality of pre-processed and encoded audio samples (action 407). According to the exemplary implementation shown in FIG. 3, audio encoder 380 is a Transformer trained to encode audio. For example, audio encoder 380 may be implemented as a 1-D Transformer $\varepsilon_{1-D}$.

Referring to FIGS. 1, 3 and 4A in combination, in some implementations, encoding of plurality of pre-processed audio samples 365 to provide the plurality of pre-processed and encoded audio samples, in action 407, may be performed by V/A synchronizer 150/350 of system 100, executed by hardware processor 104 of computing platform 102, and using audio encoder 380. In other implementations, referring to FIGS. 2, 3 and 4A in combination, plurality of pre-processed audio samples 365 to provide the plurality of pre-processed and encoded audio samples, in action 407, may be performed by V/A synchronizer 250/350 of user system 240, executed by hardware processor 244 of user system computing platform 242, and using audio encoder 380.

Although flowchart 400 depicts action 407 as following action 406, that representation is merely provided in the interests of conceptual clarity. Action 407 does follow action 405. However, in various implementations, actions 403, 405 and 407 may follow action 406, may precede action 406, may precede action 404, may precede action 402, or may be performed in parallel with, i.e., contemporaneously with, one or more of actions 402, 404 and 406.

Referring to FIGS. 3 and 4B in combination, flowchart 400 further includes providing, using one or more of the plurality of pre-processed and encoded video frame patches provided in action 406, latent representation 372 of raw video 320 (action 408). Video encoder 370 may be implemented as a 3-D Vision Transformer $\varepsilon_{3-D}$, which provides latent representation 372: $z_v = \varepsilon_{3-D}(x_v)$, $z_v \in \mathbb{R}^D$, where $x_v \in \mathbb{R}^{F \times H \times W \times C}$.

In some implementations, all of the plurality of pre-processed and encoded video frame patches provided in action 406 may be used to provide latent representation 372 of raw video 320 in action 408. However, in other implementations it may be advantageous or desirable to drop, i.e., omit, some of that plurality of pre-processed and encoded video frame patches when providing latent representation 372 of raw video 320 in action 408.

It is noted that an effective strategy for detecting V/A synchronization errors is to focus attention on the faces of people who are speaking in the video in order to identify the presence of lip-sync anomalies, which are indicative that the video sequence and its associated audio track are not synchronized. Consequently, pre-processed and encoded video frame patches included among the plurality of pre-processed and encoded video frame patches provided in action 406 that depict faces, and in particular mouths, of people depicted in raw video 320 are of particular interest for V/A synchronization.

Accordingly, in some implementations V/A synchronizer 150/250/350 may be trained to assign an attention score to each of the plurality of pre-processed and encoded video frame patches provided in action 406 based on the predicted likelihood that the pre-processed and encoded video frame patch depicts a human face. Pre-processed and encoded video frame patches having a respective attention score that satisfies a predetermined attention score threshold may be used in action 408, while pre-processed and encoded video frame patches that fail to satisfy the predetermined attention score threshold may be dropped and omitted from action 408. Alternatively, a limit of how many or what percentage of the plurality of pre-processed and encoded video frame patches provided in action 406 that may be dropped can be predetermined, and individual pre-processed and encoded video frame patches may be dropped based on their respective attention score until that number or percentage is reached, with pre-processed and encoded video frame patches having a lower attention scores being dropped before any pre-processed and encoded video frame patches having a higher attention score. Thus, in some implementations, at least one of the plurality of pre-processed and encoded video frame patches provided in action 406 is not used in action 408, and that at least one of the plurality of pre-processed and encoded video frame patches provided in action 406 is omitted from action 408 based on attention score.

As another alternative, pre-processed and encoded video frame patches among the plurality of pre-processed and encoded video frame patches provided in action 406 may be omitted from action 408 randomly, until a predetermined number or percentage of the pre-processed and encoded video frame patches included among the plurality of pre-processed and encoded video frame patches proved in action 406 have been dropped. Thus, in some implementations, at least one of the plurality of pre-processed and encoded video frame patches provided in action 406 is not used in action 408, and that at least one of the plurality of pre-processed and encoded video frame patches provided in action 406 is omitted from action 408 randomly.

Referring to FIGS. 1, 3 and 4B in combination, in some implementations, providing latent representation 372 of raw video 320 using one or more of the plurality of pre-processed and encoded video frame samples provided in action 406 may be performed in action 408 by V/A synchronizer 150/350 of system 100, executed by hardware processor 104 of computing platform 102, and using video encoder 370. In other implementations, referring to FIGS. 2, 3 and 4B in combination, providing latent representation 372 of raw video 320 using one or more of the plurality of pre-processed and encoded video frame samples provided in action 406 may be performed in action 408 by V/A synchronizer 250/350 of user system 240, executed by hardware processor 244 of user system computing platform 242, and using video encoder 370.

Although flowchart 400 depicts action 408 as following action 407, that representation is merely provided in the interests of conceptual clarity. Action 408 does follow action 406. However, in various implementations, actions 402, 404, 406 and 408 may follow action 407, may precede action 407, may precede action 405, may precede action 403, or may be performed in parallel with, i.e., contemporaneously with, one or more of actions 403, 405 and 407.

Continuing to refer to FIGS. 3 and 4B in combination, flowchart 400 further includes providing, using the plurality of pre-processed and encoded audio samples provided in action 407, latent representation 382 of raw audio 322 (action 409). Audio encoder 380 may be implemented as a 1-D Transformer $\varepsilon_{1-D}$, which provides latent representation 382 of raw audio 322: $z_a = \varepsilon_{1-D}(x_a)$, $z_a \in \mathbb{R}^D$, where $x_a \in \mathbb{R}^{1 \times S}$.

It is noted that although action 409 refers to providing latent representation 382 of raw audio 322 using all of the plurality of pre-processed and encoded audio samples provided in action 407, in some use cases, such as those in which raw audio 322 includes sparse or transient sounds, it may be advantageous or desirable to omit some of the plurality of pre-processed and encoded audio samples provided in action 407 from action 409. In those use cases, strategies analogous to those described above by reference to omitting some of the pre-processed and encoded video frame patches provided in action 406 from action 408, based on attention or at random, may be employed in action 409.

Referring to FIGS. 1, 3 and 4B in combination, in some implementations, providing latent representation 382 of raw audio 322 using the plurality of pre-processed and encoded audio samples provided in action 407 may be performed in action 409 by V/A synchronizer 150/350 of system 100, executed by hardware processor 104 of computing platform 102, and using audio encoder 380. In other implementations, referring to FIGS. 2, 3 and 4B in combination, providing latent representation 382 of raw audio 322 using the plurality of pre-processed and encoded audio samples provided in action 407 may be performed in action 409 by V/A synchronizer 250/350 of user system 240, executed by hardware processor 244 of user system computing platform 242, and using audio encoder 380.

Although flowchart 400 depicts action 409 as following action 408, that representation is merely provided in the interests of conceptual clarity. Action 409 does follow action 407. However, in various implementations, actions 403, 405, 407 and 409 may follow action 408, may precede action 408, may precede action 406, may precede action 404, may precede action 402, or may be performed in parallel with, i.e., contemporaneously with, one or more of actions 402, 404, 406 and 408.

Continuing to refer to FIGS. 3 and 4B in combination, flowchart 400 further includes synchronizing, using latent representation 372 of raw video 320 and latent representation 382 of raw audio 322, raw audio 322 with raw video 320 (action 410). Latent representation 372 of raw video 320 output by video encoder 370 and latent representation 382 of raw audio 322 output by audio encoder 380 are projected into common space 374 where they can be compared. As noted above by reference to FIG. 3, synchronization of raw audio 322 with raw video 320 is performed by comparison of latent representation 372 of raw video 320 with latent representation 382 of raw audio 322 through contrastive loss 359. It is noted that although one or more video frame patches 324 may be dropped when providing latent representation 372 of raw video 320 in action 408, video frames in their entirety are not dropped. Consequently, there is no temporal inconsistency when synchronizing raw audio 322 with raw video 320 using latent representation 372 of raw video 320 and latent representation 382 of raw audio 322.

Referring to FIGS. 1, 2 and 3 in combination, during training of V/A synchronizer 150/250/350 negative samples are produced with a 50% probability by artificially advancing or delaying the audio signal with respect to the video. The misalignment can be as small as 1 video frame and as large as possible, only limited by the clip length. V/A synchronizer 150/250/350 is optimized by minimizing the distance between synchronized audio-video pairs and maximizing the distance between unsynchronized pairs, according to:

$$\mathcal{L} = \frac{1}{2N} \sum_{n=1}^{N} y_n d_n^2 + (1 - y_n)\max(0, m - d_n)^2$$

where $y_n \in \{0, 1\}$ is the binary target for in-sync/out-of-sync audio-visual pairs, m is a margin value used as constraint, and $d_n = \|z_{a \to av} - z_{v \to av}\|_F$ is the Frobenius norm of the distance between the two latent representations.

Referring to FIGS. 1, 3 and 4B in combination, in some implementations, synchronizing raw audio 322 with raw video 320 using latent representation 372 of raw video 320 and latent representation 382 of raw audio 322, in action 410, may be performed using synchronization stage 357 of V/A synchronizer 150/350 of system 100, executed by hardware processor 104 of computing platform 102. In other implementations, referring to FIGS. 2, 3 and 4B in combination, synchronizing raw audio 322 with raw video 320 using latent representation 372 of raw video 320 and latent representation 382 of raw audio 322, in action 410, may be performed using synchronization stage 357 of V/A synchronizer 250/350 of user system 240, executed by hardware processor 244 of user system computing platform 242.

It is noted that conventional approaches for video and audio synchronization only consider synchronization at the clip level, thereby being limited to only predicting constant offsets. However, there are four types of synchronization issues that can realistically occur: (i) constant offset, (ii) drift early, (iii) drift late and (iv) intermittent offset. By way definition, constant offset refers to audio and video that are misaligned by a consistent number of frames or seconds throughout the entire duration of the title, such as a feature length movie or a TV episode in its entirety for example. Drift early refers to audio that drifts progressively earlier with respect to video through a section of a title, such as a scene for example, or through the entire title. Drift late refers to audio that drifts progressively later with respect to video through a section of a title or through the entire title. Intermittent offset refers to only one section of the title having audio and video out of synchronization.

The present application discloses a novel and inventive approach for obtaining a synchronization assessment capable of detecting the diversity of synchronization issues identified above for an entire title, such as an entire feature length movie or an entire TV episode for example. It is noted that the exemplary method outlined by flowchart 400 and described above addresses V/A synchronization at the level of individual segments of media content 112, such as scenes, for example. The technique described below enables assessment for an entire title based on the individual results.

Given a title of media content, that title is split into dialog scenes, which are not constrained to single-face clips. A prediction is made for every face and only high confidence predictions are kept, thereby eliminating non-speakers and scenes with off-screen dialog. Then, a random sample consensus (RANSAC)-based algorithm is used to exclude outlier predictions and find a linear model that describes the title synchronization. The slope and magnitude of the regression line is examined to assess whether the audio is in sync with the video, the audio leads or lags by a constant offset, or the audio has an early drift or late drift. The confidence of the general prediction is measured as the agreement among clip predictions. For visualization, a synchronization movie timeline is proposed in which the predicted offset is displayed in milliseconds for every dialog scene. Such visualization can advantageously aid quality control teams in quickly and intuitively analyzing synchronization issues without manually checking the entire movie or other title.

Thus, referring to FIGS. 1, 2 and 4B in combination, in some implementations the method outlined by flowchart 400 may further include synchronizing at least a second raw audio segment of media content 112/212 with a respective at least a second raw video segment of media content 112/212 to provide at least a second V/A synchronized media segment (action 411), and assessing, based on the V/A synchronized media segment resulting from action 410 (i.e., a first V/A synchronized media segment) and the at least second V/A synchronized media segment, a V/A synchronization status of media content 112/212 as a whole (action 412). It is noted that actions 411 and 412 are optional actions, and in some implementations may be omitted from the method outlined by flowchart 400. It is further noted that the V/A synchronization status of media content 112/212 as a whole may be that media content 112/212 is V/A synchronized, or that the V/A synchronization status of media content 112/212 includes one of: (i) constant offset, (ii) drift early, (iii) drift late or (iv) intermittent offset V/A synchronization errors.

Referring to FIGS. 1, 3 and 4B in combination, in some implementations, optional actions 411 and 412 may be performed using synchronization stage 357 of V/A synchronizer 150/350 of system 100, executed by hardware processor 104 of computing platform 102. In other implementations, referring to FIGS. 2, 3 and 4B in combination, optional actions 411 and 412 may be performed using synchronization stage 357 of V/A synchronizer 250/350 of user system 240, executed by hardware processor 244 of user system computing platform 242.

With respect to the method outlined by flowchart 400 and described above, it is noted that actions 401, 402, 403, 404, 405, 406, 407, 408, 409 and 410 (hereinafter "actions 401-410"), or actions 401-410, 411 and 412, may be performed in an automated process from which human participation may be omitted.

Thus, the present application discloses systems and methods for performing V/A synchronization with dynamic frame and sample rates that address and overcome the deficiencies in the conventional art. The present V/A synchronization solution advances the state-of-the-art by providing a novel and inventive Transformer-based V/A synchronizer model that operates directly on raw audio and raw video and advantageously avoids discarding any potentially useful information, while outperforming existing state-of-the-art methods and being significantly smaller and faster. The present V/A synchronization solution further advances the state-of-the-art by embedding video frames with timestamp information, thereby rendering the disclosed V/A synchronizer model robust to videos with different frame rates. Moreover, the V/A synchronization solution disclosed herein advantageously enables the prediction of constant offsets between audio and video as well as early and late drifts, while also providing powerful audio and video embeddings.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
a hardware processor; and
a memory storing a video/audio (V/A) synchronizer including a video encoder and an audio encoder;
the hardware processor configured to execute the V/A synchronizer to:
receive raw video and raw audio extracted from media content;
partition the raw video into a plurality of video frame patches;
partition the raw audio into a plurality of audio samples;
pre-process the plurality of video frame patches for encoding to provide a plurality of pre-processed video frame patches;
pre-process the plurality of audio samples for encoding to provide a plurality of pre-processed audio samples;
encode, using the video encoder, the plurality of pre-processed video frame patches to provide a plurality of pre-processed and encoded video frame patches;
encode, using the audio encoder, the plurality of pre-processed audio samples to provide a plurality of pre-processed and encoded audio samples;
provide, using one or more of the plurality of pre-processed and encoded video frame patches, a latent representation of the raw video;
provide, using the plurality of pre-processed and encoded audio samples, a latent representation of the raw audio; and
synchronize, using the latent representation of the raw video and the latent representation of the raw audio, the raw audio with the raw video.

2. The system of claim 1, wherein all of the plurality of pre-processed and encoded video frame patches are used to provide the latent representation of the raw video.

3. The system of claim 1, wherein at least one of the plurality of pre-processed and encoded video frame patches is not used to provide the latent representation of the raw video, and wherein the at least one of the plurality of pre-processed and encoded video frame patches is omitted from use randomly or based on attention.

4. The system of claim 1, wherein the raw video and the raw audio are not transformed from original media specifications of the media content.

5. The system of claim 1, wherein:
to pre-process the plurality of video frame patches, the hardware processor is further configured to execute the V/A synchronizer to project each of the plurality of video frame patches onto a respective video token to provide a plurality of tokenized video frame patches;
to pre-process the plurality of audio samples, the hardware processor is further configured to execute the V/A synchronizer to project each of the plurality of audio samples onto a respective audio token to provide a plurality of tokenized audio samples; or
a combination thereof.

6. The system of claim 5, wherein:
to pre-process the plurality of video frame patches, the hardware processor is further configured to execute the V/A synchronizer to concatenate the plurality of tokenized video frame patches with a learnable video modality token;
to pre-process the plurality of audio samples, the hardware processor is further configured to execute the V/A synchronizer to concatenate the plurality of tokenized audio samples with a learnable audio modality token; or
a combination thereof.

7. The system of claim 5, wherein:
to pre-process the plurality of video frame patches, the hardware processor is further configured to execute the V/A synchronizer to apply time-aware positional encoding to the plurality of tokenized video frame patches;
to pre-process the plurality of audio samples, the hardware processor is further configured to execute the V/A synchronizer to apply time-aware positional encoding to the plurality of tokenized audio samples; or
a combination thereof.

8. The system of claim 1, wherein:
the video encoder comprises a first Transformer trained to encode video;
the audio encoder comprises a second Transformer trained to encode audio; or
a combination thereof.

9. The system of claim 1, wherein a number of video frames included in the raw video varies based on an original frame rate of the media content, and wherein a number of audio samples included in the raw audio varies based on an original sample rate of the media content.

10. The system of claim 1, wherein:
to synchronize the raw audio with the raw video, the hardware processor is further configured to execute the V/A synchronizer to compare the latent representation of the raw video with the latent representation of the raw audio through a contrastive loss.

11. The system of claim 1, wherein the V/A synchronizer does not include a convolutional neural network.

12. The system of claim 1, wherein synchronizing the raw audio with the raw video provides a first V/A synchronized media segment, and wherein the hardware processor is further configured to execute the V/A synchronizer to:
synchronize at least a second raw audio segment of the media content with at least a second raw video segment of the media content to provide at least a second V/A synchronized media segment; and
assess, based on the first V/A synchronized media segment and the at least the second V/A synchronized media segment, a V/A synchronization status of the media content as a whole.

13. A method for use by a system including a hardware processor and a memory storing a video/audio (V/A) synchronizer including a video encoder and an audio encoder, the method comprising:
receiving, by the V/A synchronizer executed by the hardware processor, raw video and raw audio extracted from media content;
partitioning, by the V/A synchronizer executed by the hardware processor, the raw video into a plurality of video frame patches;
partitioning, by the V/A synchronizer executed by the hardware processor, the raw audio into a plurality of audio samples;
pre-processing, by the V/A synchronizer executed by the hardware processor, the plurality of video frame patches for encoding to provide a plurality of pre-processed video frame patches;
pre-processing, by the V/A synchronizer executed by the hardware processor, the plurality of audio samples for encoding to provide a plurality of pre-processed audio samples;
encoding, by the V/A synchronizer executed by the hardware processor and using the video encoder, the plurality of pre-processed video frame patches to provide a plurality of pre-processed and encoded video frames;
encoding, by the V/A synchronizer executed by the hardware processor and using the audio encoder, the plurality of pre-processed audio samples to provide a plurality of pre-processed and encoded audio samples;
providing, by the V/A synchronizer executed by the hardware processor and using one or more of the plurality of pre-processed and encoded video frame patches, a latent representation of the raw video;
providing, by the V/A synchronizer executed by the hardware processor and using the plurality of pre-processed and encoded audio samples, a latent representation of the raw audio; and
synchronizing, by the V/A synchronizer executed by the hardware processor and using the latent representation of the raw video and the latent representation of the raw audio, the raw audio with the raw video.

14. The method of claim 13, wherein all of the plurality of pre-processed and encoded video frame patches are used to provide the latent representation of the raw video.

15. The method of claim 13, wherein at least one of the plurality of pre-processed and encoded video frame patches is not used to provide the latent representation of the raw video, and wherein the at least one of the plurality of video frame patches is omitted from use randomly or based on attention.

16. The method of claim 13, wherein the raw video and the raw audio are not transformed from original media specifications of the media content.

17. The method of claim 13, further comprising:
pre-processing the plurality of video frame patches includes projecting, by the V/A synchronizer executed by the hardware processor, each of the plurality of video frame patches onto a respective video token to provide a plurality of tokenized video frame patches;
pre-processing the plurality of audio samples by projecting, by the V/A synchronizer executed by the hardware processor, each of the plurality of audio samples onto a respective audio token to provide a plurality of tokenized audio samples; or
a combination thereof.

18. The method of claim 17, further comprising:
pre-processing the plurality of video frame patches by concatenating, by the V/A synchronizer executed by the hardware processor, the plurality of tokenized video frame patches with a learnable video modality token; and
pre-processing the plurality of audio samples by concatenating, by the V/A synchronizer executed by the hardware processor, the plurality of tokenized audio samples with a learnable audio modality token; or
a combination thereof.

19. The method of claim 17, further comprising:
pre-processing the plurality of video frame patches by applying, by the V/A synchronizer executed by the hardware processor, time-aware positional encoding to the plurality of tokenized video frame patches; and pre-processing the plurality of audio samples by applying, by the V/A synchronizer executed by the hardware processor, time-aware positional encoding to the plurality of tokenized audio samples; or a combination thereof.

20. The method of claim 13, wherein:

the video encoder comprises a first Transformer trained to encode video;

the audio encoder comprises a second Transformer trained to encode audio; or a combination thereof.

21. The method of claim 13, wherein how many video frames are included in the raw video varies based on an original frame rate of the media content, and wherein how many audio samples are included in the raw audio varies based on an original sample rate of the media content.

22. The method of claim 13, wherein synchronizing the raw audio with the raw video comprises comparing the latent representation of the raw video with the latent representation of raw audio through a contrastive loss.

23. The method of claim 13, wherein the V/A synchronizer does not include a convolutional neural network.

24. The method of claim 13, wherein synchronizing the raw audio with the raw video provides a first V/A synchronized media segment, the method further comprising:

synchronizing, by the V/A synchronizer executed by the hardware processor, at least a second raw audio segment of the media content with a respective at least a second raw video segment of the media content to provide at least a second V/A synchronized media segment; and assessing, by the V/A synchronizer executed by the hardware processor based on the first V/A synchronized media segment and the at least the second V/A synchronized media segment, a V/A synchronization status of the media content as a whole.

* * * * *